Patented June 13, 1939

2,162,331

UNITED STATES PATENT OFFICE 2,162,331

QUICK-SETTING PRINTING INK AND PROCESS OF MAKING SAME

Carleton Ellis, Montclair, N. J., assignor to Ellis Laboratories, Inc., a corporation of New Jersey No Drawing. Application April 13, 1938, Serial No. 201,809

9 Claims. (Cl. 260—42)

This invention relates to printing inks and particularly to typographical inks of the rapid- or quick-drying type. It also involves the preparation of printing inks which at room temperature are fluent masses exhibiting thixotropic properties.

Printing inks of the rapid- or quick-drying type may be differentiated from the usual variety of inks by the solvent or thinning agent employed. In the former compositions the liquid ingredient, for the most part, is one which evaporates readily when the ink film is subjected for a short period of time to elevated temperatures and thus effects hardening or drying. In the ordinary type of printing ink the liquid vehicle is mainly an oil of the drying-oil type, and hardening or drying is the result of atmospheric oxidation of the oleaginous material. In the latter instance considerable time may elapse before complete hardening or setting of the ink film is accomplished, and during which it is in a soft, more or less pliable state. During this drying period smudging or smearing of the ink film may occur if the printed surface is subjected to undue handling or if it should come in contact with another object or surface.

Inks made according to my invention are of the quick-drying type and comprise not only a liquid vehicle or thinning agent which evaporates rapidly at elevated temperatures but also a heat-reactive resin to serve as a binding agent. In this manner I secure an ink composition which sets or dries not only because of rapid elimination of the liquid ingredient but also due to hardening of the binding agent on the application of heat. Thus, when paper, on which printing is made with an ink prepared according to my invention, is subjected momentarily to heat and then afterwards quickly cooled, the ink films are hardened or set, and there is little or no danger of smudging or smearing during any subsequent handling operations.

Another distinguishing feature of my ink compositions is that they exhibit thixotropic properties. That is, when allowed to stand, their viscosity increases, and they become substantially non-fluid or even solid. However, when stirred or otherwise disturbed for a short time, without the application of heat, they resume their fluent characteristics and are readily flowable.

One method of preparing inks suitable for my purpose comprises reacting two or more substances, in the presence of a liquid solvent, whereby a solution of the resinous body is obtained. The solution is then concentrated to a syrup, preferably by evaporation under reduced pressure, so that the temperature may be kept as low as possible. As an illustration of this procedure urea is treated with aqueous formaldehyde and the resulting solution evaporated, under reduced pressure, until a liquid product of syrupy consistency is secured. During the evaporation step an inert gas, e. g., nitrogen, may be passed through the liquid, thus aiding in more rapidly concentrating the mass to desired degree of consistency. The product, on cooling, appeared as a soft, semi-solid mass. The thixotropic properties of this composition are readily shown by vigorously stirring the mass whereupon it becomes fluent or flowable, but again slowly becomes a more or less solid mass when allowed to stand undisturbed.

After concentrating the solution of resinous material to a syrup and during cooling of the latter to room temperature, some clouding of the liquid mass or partial precipitation of the resin occurs. This is not detrimental to my purpose provided such insoluble material remains dispersed throughout the liquid and does not settle out or coagulate.

With the thixotropic mass is incorporated the pigment and, if desired, extending agents, fillers, modifying agents, etc. In selection of the latter materials it should be borne in mind that they must not possess or exhibit properties which would be detrimental or deleterious to the thixotropy shown by the resin syrup.

Another procedure comprises reacting urea and the aldehyde in the presence of water as a solvent and then adding a miscible higher-boiling solvent, e. g., glycol or glycerol. The resulting product is then concentrated to a thixotropic mass by heating under reduced pressure. In this manner a large proportion, if not all, of the water may be replaced or substituted by the higher-boiling solvent. Pigment and, if desired, modifying agents are incorporated with the concentrated thixotropic mass.

In some instances I may admix the thixotropic syrup with a resinous syrup which does not show thixotropic properties, and the mixture serves as the source of the binding agent for my ink compositions. Examples of resin syrups, which may be prepared in a non-thixotropic condition and are suitable for blending, are concentrated aqueous solutions of bodies resulting from the interaction of thiourea and formaldehyde or phenol and formaldehyde. The resin syrups, of course, should be compatible so that they mix or blend readily and no evidence of any undesirable interaction is obtained. It is necessary, also, that the proportion of thixotropic syrup be sufficiently great that the resulting composition exhibits thixotropic to a substantial extent and thus be suitable for my purpose.

In other cases it may be advantageous to interact (in the presence of water) urea and formaldehyde, using a considerable excess of the latter, and then add thiourea to the product to react with the remaining aldehyde. In this manner a liquid homogeneous mixture of the two resinous bodies is secured which may be concentrated to a thixotropic syrup.

Although water will serve admirably as the liquid ingredient in many cases, I do not wish to limit my invention to the use of this fluid only. Examples of other media which are suitable for my purpose include mono- or polyhydric alcohols, e. g., isobutanol and glycol, or esters such as glycol mono- or diacetate, or ethers, for example, diethylene glycol.

The following examples will illustrate my invention. All parts are by weight.

*Example 1.*—Fifty parts of urea and 200 parts of an aqueous 37 per cent (by weight) solution of formaldehyde were heated, under reflux for 30 minutes, on a water bath. During this operation the pH of the solution was maintained at about 7 by using bromothymol blue as an indicator and occasionally adding a few drops of aqueous alkali. At the end of the heating period the liquid product was evaporated under reduced pressure and at a temperature not exceeding 70° C. until its water or other volatile material content was approximately 24 per cent. In the thick syrupy liquid was dissolved sufficient glycerol dischlorohydrin (as a catalyst for hardening the resin) to give a 2 per cent solution. Five parts of the liquid mixture were ground with 0.5 part of carbon black. The composition so obtained was of the short ink type and possessed good body and tack. A thin film of it on paper dried quickly at 160° C.

This ink composition exhibited thixotropic properties, i. e., on standing gradually became solid, and when the solid composition was subjected to a mild grinding operation, it rapidly became fluid.

*Example 2.*—Fifty parts of phenol (carbolic acid), 87.5 parts of an aqueous 37 per cent (by weight) solution of formaldehyde, and 1.4 parts of caustic soda were reacted at 70° C. for 2½ hours. Afterwards the liquid mixture was neutralized with lactic acid and distilled under reduced pressure, the temperature not exceeding 60° C., until its water or other volatile material content was approximately 18 per cent. Six parts of this syrup and 6 parts of the syrup as prepared in Example 1 were mixed and then 1 part of glycerol dichlorohydrin incorporated. Afterwards 1.5 parts of carbon black were ground into the liquid composition. This ink exhibited good flow, body and tack. A thin film of it dried rapidly at temperatures of 140° C. and higher.

On standing the ink stiffened considerably but did not become solid. When the stiffened product was stirred, it readily became liquid and flowable again.

*Example 3.*—As an indication of the degree of thixotropy exhibited by a urea-formaldehyde syrup, penetration measurements were made after the syrup had been ground or stirred, after the latter had stood for several hours, and then after regrinding or restirring the syrup.

The following method was used: In the plunger of a penetrometer was inserted a needle, 3.35 mm. in diameter, having a flat circular head 7 mm. in diameter. The needle and plunger weighed 52 grams. The time required for the needle to penetrate the syrup to a specified distance was then determined. In all instances penetration was ascertained first while the syrup was in the liquid or fluid state (rendered so by grinding or stirring), after which the syrup was allowed to stand and assume the more viscous or even solid state. Penetration was again measured while the syrup was in the latter condition. This sequence of changes of state and determination of penetration can be repeated several times if desired. (This same apparatus and procedure were employed in all other examples of penetration determinations described herein. When the weight of the plunger and needle was insufficient to effect reasonably rapid movement through the sample (thixotropic resin syrup or ink composition therefrom), additional weights were placed on the plunger. In all cases measurements were made at room temperature).

A syrup was prepared, as described in Example 1, using 60 grams of urea and 225 grams of aqueous formaldehyde. This syrup contained 27 per cent of material volatile at 100°-105° C. Penetration measurements on the products were as follows:

| Condition of syrup | Distance penetrated | Time | Weight |
|---|---|---|---|
|  | *Millimeters* | *Seconds* | *Grams* |
| Stirred | 25 | 85 | 52 |
| After standing 2 days | No penetration |  | 202 |
| Restirred | 25 | 20 | 102 |

These results clearly show the thixotropic properties of the syrup, that is, the syrup becomes liquid in character on stirring and exhibits a low penetrability, but after standing for some hours sets up and becomes stiff with a consequent increase in penetration.

*Example 4.*—Fifty-six parts of the thixotropic syrup (as made in Example 3) were incorporated with 3 parts of the phenol-resin syrup (as preglycerine dichlorohydrin. This ink composition had a heavy body and was of the short ink type. Its thixotropic properties are indicated by the following penetration data.

| Condition of ink | Distance penetrated | Time | Weight |
|---|---|---|---|
|  | *Millimeters* | *Seconds* | *Grams* |
| Stirred | 25 | 46 | 52 |
| After standing overnight | No penetration |  | 202 |
| Restirred | 25 | 20 | 152 |

*Example 5.*—Seven parts of the urea-resin syrup (as prepared in Example 1) were mixed with 3 parts of the phenol- resin syrup (as prepared in Example 2). Afterwards there were incorporated, in the order mentioned, 0.5 part of glycerol dichlorohydrin, 0.8 part of carbon black, and 0.3 part of a blue toner. The resulting ink composition was somewhat heavy-bodied but flowable. Films of it dried very quickly at temperatures of 155° C. and higher.

This ink exhibited thixotropic properties analogous to those described in Example 2.

*Example 6.*—An aqueous urea-formaldehyde syrup was secured by refluxing for twenty minutes a mixture of 75 parts of urea and 275 parts of aqueous 37 per cent (by weight) formaldehyde solution. During this operation the pH of the solution was maintained at about 7. The liquid product was subjected to distillation under reduced pressure (29.5 inches of mercury), the temperature being kept at 65°-70° C., until the loss in weight amounted to 150 parts. During distillation a slow stream of carbon dioxide was bubbled through the liquid mass to aid in removing volatile portions. The liquid mass on cooling became solid, but did soften when ground. The solid urea-formaldehyde product was found to contain 37 per cent of material volatile at 100°–105° C. (atmospheric pressure).

An ink composition was made by incorporating 35 parts of the urea-formaldehyde product with 15 parts of the phenol-formaldehyde syrup (described in Example 2), 1.2 parts of glycerol dichlorohydrin, 8 parts of carbon black and 0.7 part of Prussian blue. This ink was somewhat heavy-bodied but had fairly good flow and exhibited thixotropic properties.

*Example 7.*—Penetration data obtained with the ink prepared in Example 6 are as follows:

| Condition of ink | Distance penetrated | Time | Weight |
|---|---|---|---|
|  | *Millimeters* | *Seconds* | *Grams* |
| After stirring | 29 | 2 | 52 |
| After standing overnight | 29 | 380 | 52 |
| Restirred | 29 | 2.8 | 52 |
| After standing 1 day more | 25 | 218 | 152 |
| Restirred | 29 | 5.8 | 52 |
| After standing 2 days more | 10 | 685 | 202 |
| Restirred | 28 | 6.2 | 52 |

*Example 8.*—Thirty-five parts of urea were added to 190 parts of 37 per cent (by weight) aqueous solution of formaldehyde. Reaction was started by gently heating the mixture under reflux, after which the source of heat was withdrawn and interaction allowed to proceed spontaneously. With the latter apparently ceased, as evidenced by no further boiling or formation of bubbles in the liquid, 15 parts of thiourea were added and the mixture heated (under reflux) for 30 minutes. During these operations the pH of the solution was maintained at about 7, as described in Example 1. The liquid product so obtained was concentrated by evaporation, under reduced pressure and temperautre not exceeding 70° C., until its water or other volatile material content was about 17 per cent. While concentration was being effected, a stream of carbon dioxide gas was passed through the liquid mass.

In 6 parts of the syrup was dissolved 0.3 part of glycerol dichlorohydrin. Afterwards there were incorporated in the liquid mixture (in the order named) 0.5 part of red pigment, 0.7 part of magnesium carbonate and 0.3 part of hydrated aluminum oxide (as extending agents). This ink composition, though possessing a heavy body, had good flow and tack, and films of it (on paper) dried in a few seconds at temperatures of 130° C. and higher.

*Example 9.*—To 20 parts of ethylene glycol were added 30 parts of urea and the mixture kept at about 80° C. until all the solid was completely wetted by the liquid. Afterwards 30 parts of paraformaldehyde were added, and the whole mass maintained at 80° C. for about 45 minutes. During interaction of urea and aldehyde the pH of the liquid was maintained at about 7 by addition of alkali. A clear syrup was obtained which on cooling to room temperature appeared as a thixotropic mass.

Six parts of the thixotropic product were ground with 0.6 part of carbon black. The resulting ink composition was somewhat heavy-bodied, but possessed good flowing qualities. The fluid mass, on standing, slowly changed to a solid mass. The latter was readily made fluid again by grinding.

*Example 10.*—A syrup, made as described in Example 9, exhibited thixotropic properties as indicated by the following measurements of penetration.

| Condition of syrup | Distance penetrated | Time | Weight |
|---|---|---|---|
|  | *Millimeters* | *Seconds* | *Grams* |
| After stirring | 29 | 1.6 | 52 |
| After standing overnight | 29 | 11.8 | 52 |
| Restirred | 29 | 2 | 52 |

*Example 11.*—An ink composition, formulated as indicated in Example 9, gave the following data when tested with a penetrometer.

| Condition of ink | Distance penetrated | Time | Weight |
|---|---|---|---|
|  | *Millimeters* | *Seconds* | *Grams* |
| After stirring | 27 | 14 | 102 |
| After standing overnight | 27 | 850 | 102 |
| Restirred | 27 | 25 | 102 |
| After standing 3 days more | 27 | 105 | 202 |
| Restirred | 27 | 34 | 102 |
| After standing 1 day more | 27 | 235 | 202 |
| Restirred | 27 | 95 | 102 |
| After standing 2 days more | 27 | 203 | 202 |
| Restirred | 27 | 151 | 102 |

*Example 12.*—With 5 parts of the thixotropic syrup, as prepared in Example 9, were incorporated 1.5 parts of zinc sulphide, 0.5 part of hydrated alumina and 0.5 part of zinc oxide. Afterwards there were worked into the composition 1.5 parts of a 10 per cent solution of ethyl cellulose in benzyl alcohol. The resulting white ink exhibited good flow and body, and thin films of it dried quickly at a temperature of 155° C. It also possessed thixotropic properties.

*Example 13.*—A thixotropic resin syrup was made, employing the procedure described in Example 9, from 35 parts of urea, 35 parts of paraformaldehyde and 20 parts of ethylene glycol.

Four parts of the thixotropic syrup were ground with 1.5 parts of a 10 per cent solution of ethyl cellulose in benzyl alcohol, and then 0.7 part of an orange-colored pigment was added. This ink composition possessed very good flow, and thin films of it (on paper) dried in a few seconds at 145° C. It also exhibited thixotropic properties.

*Example 14.*—Another thixotropic syrup was prepared, according to the procedure described in Example 9, but using 35 parts of urea, 35 parts of paraformaldehyde and 25 parts of diethylene glycol. After cooling to room temperature, 5 parts more of diethylene glycol were worked into the mass.

With 7 parts of the above syrup were incorporated 0.7 part of a red pigment and 0.15 part of glycerol dichlorohydrin. The red ink thus made possessed good flowing qualities, and thin films of it dried in a few seconds at 145° C.

*Example 15.*—Penetration measurements were made using a thixotropic resinous syrup which was prepared as described in Example 14. The results are listed below.

| Condition of syrup | Distance penetrated | Time | Weight |
|---|---|---|---|
|  | *Millimeters* | *Seconds* | *Grams* |
| After stirring | 29 | 0.6 | 52 |
| After standing overnight | 29 | 3.6 | 52 |
| After stirring | 29 | 0.6 | 52 |

*Example 16.*—A thixotropic printing ink composition was made by incorporating 6 parts of a red pigment and 1.3 parts of glycerol dichlorohydrin with 61 parts of the syrup as prepared in Example 14. Penetration measurements were made over a period of several days with the following results. In all instances the weight was 52 grams.

| Condition of ink | Distance penetrated | Time |
|---|---|---|
| | Millimeters | Seconds |
| After stirring | 28 | 8 |
| After standing 2 days | 28 | 15 |
| Restirred | 28 | 7 |
| After standing 1 day additional | 28 | 16 |
| Restirred | 28 | 7.6 |
| After standing 3 days more | 28 | 35 |
| Restirred | 28 | 7.8 |
| After standing 1 day additional | 28 | 57 |
| Restirred | 28 | 8.2 |
| After standing 2 days more | 28 | 83 |
| Restirred | 28 | 7.6 |

Although my invention has been illustrated with resinous bodies made from urea and formaldehyde, I do not wish to limit myself to the employment of only formaldehyde. In many instances other aldehydes, such as acetaldehyde, benzaldehyde and the like, may serve equally well to furnish resinous bodies which will yield syrupy compositions exhibiting thixotropic properties. Furthermore, in addition to using mixtures of urea and thiourea in the preparation of thixotropic, syrupy compositions, I may replace either one or both of them by their substituted derivatives, e. g., methyl urea.

In many of the inks, according to my invention, water may be the liquid vehicle or thinning agent, and as such it possesses many advantages. For example, it is classed as a non-flammable and inexpensive ingredient. Again, its boiling point is sufficiently low so that very high temperatures (and possible consequent damage therefrom to the printed surface) are not required for rapid hardening of ink films containing this ingredient. However, the proportion of water in the ink composition should not be sufficiently great as to cause undue wetting or other undesirable effects when the ink films are applied to paper or other appropriate surfaces. As previously mentioned, though, many liquid vehicles, such as alcohols, esters and ethers, are suitable for my purpose.

It will be seen that the inks which fall within the scope of my invention are those which comprise a binding agent consisting of one or more heat-reactive synthetic resins, pigmenting material, and a liquid vehicle. By the term heat-reactive I mean that the resinous body is initially soluble in certain solvents and fusible, but that on the application of sufficient heat it becomes insoluble and, in many instances, also infusible. The liquid vehicle, which serves as the solvent or thinning agent, should be present in the requisite proportion to render the ink composition thixtropic at room temperature, i. e., the said composition becomes considerably more viscous or even solid on standing, but is readily reconverted into a fluent or flowable mass when subjected to a mild stirring or grinding operation. Furthermore, the liquid vehicle should not be so volatile that the ink will dry or set too rapidly at room temperature, but will permit ready hardening of a film of ink when the latter is subjected to slightly elevated temperatures.

In addition to the above-named components there may be present also small proportions of modifying agents. The latter include such materials as catalysts which quicken or accelerate hardening of the resin when heat is applied to the ink film, extending agents (such as hydrated alumina) to be employed in conjunction with pigmenting bodies, and materials which alter the flow, body or tack of the ink composition. Examples of the latter materials are cellulose ethers and esters.

My invention also involves the preparation of thixotropic compositions to be employed in the formulating of printing inks. Such compositions comprise the heat-reactive resinous binding agent and a liquid vehicle. They may be obtained, for example, by reacting the components, from which the resin is derived, in the presence of a relatively large quantity of liquid vehicle and then concentrating the resulting solution of resin until the proportion of liquid vehicle is sufficient to furnish a product having thixotropic properties at room temperature. Thixotropic compositions particularly suitable for my purpose are those containing aminoplasts, or resinous bodies arising from the interaction of amino compounds and aldehydes, illustrative of which is the reaction product from urea and formaldehyde. Another phase contemplates effecting interaction of the components, from which the resin is derived, in the presence of sufficient liquid vehicle to give a thixotropic mass without the necessity of concentrating the reaction product.

Again, non-thixotropic syrups of resins may be incorporated with the thixotropic resinous compositions to yield binding agents consisting of two or more resinous bodies. The syrup which does not exhibit thixotropic properties should, of course, be miscible and compatible with the thixtropic composition, and the proportion of the former should not be sufficiently great to render the mixture non-thixotropic. By the term resin syrup or syrup of resin as used herein I mean the thick, viscous, flowable solutions obtained by the solution of the resinous material in a relatively small proportion of solvent. Preferably the non-thixotropic syrups are of extraneous origin, i. e., the resinous bodies therein represent a type distinct from that in the resinous materials exhibiting thixotropy. For example, a non-thixotropic syrup of a phenol-formaldehyde resin (syrup of extraneous origin) may be incorporated with a thixotropic urea-formaldehyde composition. Other non-thixotropic syrups of phenoplasts or resinous compositions derived from phenolic bodies and aldehydes may, of course, be employed.

It should be noted also that many of the binding agents suitable for my purpose, e. g., those derived from urea and formaldehyde, or sometimes even from phenol and formaldehyde, are colorless or substantially so. This will be recognized as extremely advantageous, particularly in the preparation of colored printing inks such as reds, blues, greens and the like. The binding egent, being substantially free of any undesirabel tint, will not interfere with the coloring power of the pigmenting material, thus allowing in many instances the employment of less pigment to secure the desired degree or shade of color without any noticeable disturbing undertone.

What I claim is:

1. A quick-drying printing ink composition comprising a binding agent consisting of a heat-reactive aminoplast resin, pigmenting material, and a liquid vehicle therefore in proportion sufficient to render said composition a fluent mass having thixotropic properties at room temperature.

2. A quick-drying printing ink composition, ac- 2,162,331 cording to claim 1, in which the binding agent is derived from urea and an aldehyde.

3. A quick-drying printing ink composition, according to claim 1, in which the binding agent is derived from urea and formaldehyde.

4. A quick-drying printing ink composition, according to claim 1, in which the binding agent is derived from urea and an aldehyde and is admixed with a compatible resin syrup of extraneous origin not exhibiting thixotropic properties, the proportion of said resin syrup being insufficient to destroy the thixotropic properties of said ink composition.

5. The process which comprises concentrating a solution of a heat-reactive aminoplast resin to a fluent mass having thixotropic properties at room temperature, and incorporating pigmenting material, whereby a fluent quick-drying printing ink composition having thixotropic properties at room temperature is obtained.

6. The process, according to claim 5 in which the heat-reactive aminoplast resin is derived from urea and an aldehyde.

7. The process which comprises concentrating a solution of a heat-reactive resinous product derived from urea and an aldehyde to a fluent mass possessing thixotropic properties at room temperature, admixing said fluent mass with a compatible resin syrup of extraneous origin not exhibiting thixotropic properties at room temperature, the proportion of said resin syrup being insufficient to destroy the thixotropic properties of said fluent mass, and incorporating pigmenting material, whereby a fluent quick-drying printing ink composition having thixotropic properties at room temperature is obtained.

8. The process which comprises reacting urea and an aldehyde to give a heat-reactive resinous product and simultaneously incorporating a liquid vehicle, the proportion of said liquid vehicle being sufficient to render said product a fluent mass having thixotropic properties at room temperature, and incorporating pigment material, whereby a fluent quick-drying printing ink composition having thixotropic properties at room temperature is obtained.

9. The process which comprises reacting urea and an aldehyde to give a heat-reactive resinous product and simultaneously incorporating a liquid vehicle, the proportion of said liquid vehicle being sufficient to render said product a fluent mass having thixotropic properties at room temperature, admixing said fluent mass with a compatible resin syrup of extraneous origin not exhibiting thixotropic properties at room temperature, the proportion of said resinous syrup being insufficient to destroy the thixotropic properties of said fluent mass, and incorporating pigmenting material, whereby a fluent quick-drying printing ink having thixotropic properties at room temperature is obtained.

CARLETON ELLIS.

CERTIFICATE OF CORRECTION.

Patent No. 2,162,331.   June 13, 1939.

CARLETON ELLIS.

It is hereby certified that error appears in the printed specification of the above numbered patent requiring correction as follows: Page 2, second column, line 37, Example 4, for the words and syllable "with 3 parts of the phenol-resin syrup (as pre-" read with 5 parts of carbon black and 1.3 parts of; and that the said Letters Patent should be read with this correction therein that the same may conform to the record of the case in the Patent Office.

Signed and sealed this 19th day of September, A. D. 1939.

Henry Van Arsdale,
Acting Commissioner of Patents.

(Seal)

cording to claim 1, in which the binding agent is derived from urea and an aldehyde.

3. A quick-drying printing ink composition, according to claim 1, in which the binding agent is derived from urea and formaldehyde.

4. A quick-drying printing ink composition, according to claim 1, in which the binding agent is derived from urea and an aldehyde and is admixed with a compatible resin syrup of extraneous origin not exhibiting thixotropic properties, the proportion of said resin syrup being insufficient to destroy the thixotropic properties of said ink composition.

5. The process which comprises concentrating a solution of a heat-reactive aminoplast resin to a fluent mass having thixotropic properties at room temperature, and incorporating pigmenting material, whereby a fluent quick-drying printing ink composition having thixotropic properties at room temperature is obtained.

6. The process, according to claim 5 in which the heat-reactive aminoplast resin is derived from urea and an aldehyde.

7. The process which comprises concentrating a solution of a heat-reactive resinous product derived from urea and an aldehyde to a fluent mass possessing thixotropic properties at room temperature, admixing said fluent mass with a compatible resin syrup of extraneous origin not exhibiting thixotropic properties at room temperature, the proportion of said resin syrup being insufficient to destroy the thixotropic properties of said fluent mass, and incorporating pigmenting material, whereby a fluent quick-drying printing ink composition having thixotropic properties at room temperature is obtained.

8. The process which comprises reacting urea and an aldehyde to give a heat-reactive resinous product and simultaneously incorporating a liquid vehicle, the proportion of said liquid vehicle being sufficient to render said product a fluent mass having thixotropic properties at room temperature, and incorporating pigment material, whereby a fluent quick-drying printing ink composition having thixotropic properties at room temperature is obtained.

9. The process which comprises reacting urea and an aldehyde to give a heat-reactive resinous product and simultaneously incorporating a liquid vehicle, the proportion of said liquid vehicle being sufficient to render said product a fluent mass having thixotropic properties at room temperature, admixing said fluent mass with a compatible resin syrup of extraneous origin not exhibiting thixotropic properties at room temperature, the proportion of said resinous syrup being insufficient to destroy the thixotropic properties of said fluent mass, and incorporating pigmenting material, whereby a fluent quick-drying printing ink having thixotropic properties at room temperature is obtained.

CARLETON ELLIS.

---

CERTIFICATE OF CORRECTION.

Patent No. 2,162,331.   June 13, 1939.

CARLETON ELLIS.

It is hereby certified that error appears in the printed specification of the above numbered patent requiring correction as follows: Page 2, second column, line 37, Example 4, for the words and syllable "with 3 parts of the phenol-resin syrup (as pre-" read with 5 parts of carbon black and 1.3 parts of; and that the said Letters Patent should be read with this correction therein that the same may conform to the record of the case in the Patent Office.

Signed and sealed this 19th day of September, A. D. 1939.

Henry Van Arsdale,
Acting Commissioner of Patents.

(Seal)